US012605666B2

(12) United States Patent
Schumacher

(10) Patent No.: US 12,605,666 B2
(45) Date of Patent: Apr. 21, 2026

(54) AUTOMATED AIR FILTER

(71) Applicant: Tim Schumacher, Orland Park, IL (US)

(72) Inventor: Tim Schumacher, Orland Park, IL (US)

( * ) Notice: Subject to any disclaimer, the term of this patent is extended or adjusted under 35 U.S.C. 154(b) by 269 days.

(21) Appl. No.: 18/297,519

(22) Filed: Apr. 7, 2023

(65) Prior Publication Data

US 2024/0335781 A1     Oct. 10, 2024

(51) Int. Cl.
| | |
|---|---|
| *B01D 46/46* | (2006.01) |
| *B01D 46/00* | (2022.01) |
| *B01D 46/18* | (2006.01) |
| *F25D 23/12* | (2006.01) |

(52) U.S. Cl.
CPC ......... *B01D 46/46* (2013.01); *B01D 46/0005* (2013.01); *B01D 46/185* (2013.01); *F25D 23/12* (2013.01); *B01D 2279/00* (2013.01); *F25D 2323/0024* (2013.01)

(58) Field of Classification Search
None
See application file for complete search history.

(56) References Cited

U.S. PATENT DOCUMENTS

| | | | | |
|---|---|---|---|---|
| 4,174,205 A | * | 11/1979 | Koushiafes | ............ B01D 46/18 |
| | | | | 55/501 |
| 4,221,576 A | * | 9/1980 | Phillips, Jr. | ............ B01D 46/46 |
| | | | | 55/352 |
| 6,152,998 A | * | 11/2000 | Taylor | .................. B01D 46/444 |
| | | | | 96/429 |
| 2006/0102006 A1 | * | 5/2006 | Powell | .................. B01D 46/18 |
| | | | | 96/429 |
| 2012/0042782 A1 | * | 2/2012 | White | .................... B01D 46/10 |
| | | | | 55/501 |
| 2013/0340466 A1 | | 12/2013 | Hines | |
| 2014/0373719 A1 | * | 12/2014 | Spiegel | .............. B01D 46/0038 |
| | | | | 55/354 |
| 2020/0338491 A1 | * | 10/2020 | Yamamoto | ........... B01D 46/442 |
| 2024/0295066 A1 | * | 9/2024 | Wang | ...................... D06F 58/26 |

FOREIGN PATENT DOCUMENTS

| | | | | |
|---|---|---|---|---|
| CN | 118434046 A | * | 8/2024 | |
| KR | 100675385 B1 | * | 1/2007 | |

* cited by examiner

*Primary Examiner* — Brit E. Anbacht
(74) *Attorney, Agent, or Firm* — Neal, Gerber & Eisenberg LLP

(57) ABSTRACT

An automated air filter comprises a frame, a plurality of reels mounted on the frame such that the reels are rotatable, a filter sheet extending between the reels and across the frame, and an actuator configured for rotating one or more of the reels. The automated air filter can automatically prevent accumulation of debris and avoid clogging, with little or no effort by the owner or user.

11 Claims, 3 Drawing Sheets

AUTOMATED AIR FILTER

CROSS-REFERENCE TO RELATED APPLICATIONS

None.

FIELD OF THE INVENTION

The present disclosure relates to air filters for refrigeration and ventilation devices.

BACKGROUND OF THE INVENTION

Refrigerators and HVAC systems such as furnaces and air conditioners rely on movement of air, such as by moving air across a heating element or refrigerator coil so as to warm the air and/or cool the structure. Refrigerators contain a heat pump that collects heat from an internal compartment and transfers it to an external environment by flowing a refrigerant through a coil. In this way, the inside of the refrigerator is cooled to a temperature below the ambient temperature of the surrounding environment. Such coils are usually located underneath and/or behind the refrigerator. As the refrigerant passes through these coils, heat is transferred from the coils to air passing over the coils and to the environment.

To facilitate transfer of heat from the refrigerator coils to the environment, conventional refrigerators are designed to flow air over and around the coils, such as by using fans to direct air over the coils, especially when the heat pump is in operation. While this airflow improves heat transfer away from the coils, the airflow also increases the collection of debris on the coils.

Refrigerator coils often get covered by debris such as dust, dirt, grime, hair, and the like. The debris interferes with the transfer of heat from the warm coils to the cool environment. This reduces the refrigerator's efficiency and causes additional and unnecessary energy consumption and reduces the longevity of the refrigerator.

To prevent the collection of debris on the coils, periodic cleaning of the coils is recommended. This generally involves brushing, scrubbing or vacuuming the coils, and it may be done by the owner or by a technician. However, due to the location of the coils, this can be inconvenient, labor intensive and messy. In addition, because the coils are often positioned very close to one another, and because there is very limited access to the coils, the coils cannot be completely or effectively cleaned. Therefore, it is desirable to prevent debris from accumulating on the coils.

White US Pat. App. Publication No. 20120042782 A1 discusses an air filtering assembly capable of filtering the air having particle matter prior to entrance of the air into a compressor compartment of a refrigeration apparatus comprising: an air filtering device where it said air filtering device includes a frame and a filter member where the filter member includes a front surface and a rear surface; and a support device, where said support device is capable of attaching to an underneath portion of a door of the refrigeration apparatus. The filter member is made of a filtering material, where the filtering material is selected from at least one of a micro fiber material, a plastic material and a paper material. The frame of the air filtering device may be either a rectangular shape or a square shape.

Hines US Pat. App. Publication No. 20130340466 A1 discusses a filter device for use with refrigerators. The filter device has a frame, a filter element and at least one connection member. The filter device is connected to a refrigerator thereby sealing the space below a refrigerator. Once in potion, the filter device forces air to pass through the filter element prior to accessing the coils of the refrigerator. This system helps to prevent the build-up of debris on the coils which reduces the need to clean the coils, improves the efficiency of the refrigerator and improves the longevity of the refrigerator.

SUMMARY OF THE INVENTION

As one aspect of the present invention, an automated air filter comprises a frame; a plurality of reels mounted on the frame such that the reels are rotatable; a filter sheet extending between the reels and across the frame; and an actuator configured for rotating one or more of the reels.

Various embodiments of the present invention provide one or more advantages over existing approaches. For instance, the present filter devices and methods can automatically prevent accumulation of debris and avoid clogging, with little or no effort by the owner or user. In some embodiments, the present devices and methods can reduce the frequency of changing an air filter. In some embodiments, the present devices and methods can improve the efficiency and longevity of refrigerators and HVAC systems and/or save energy. In some embodiments, the present devices and methods can be retrofit to any existing refrigerator or HVAC system.

These and other features or advantages will become apparent from the specification, drawings and claims.

DETAILED DESCRIPTION OF THE INVENTION

As one aspect of the present invention, an automated filter device is provided. To exemplify and explain the invention, an embodiment of the automated air filter is described in connection with a refrigerator. It is contemplated that one skilled in the art can readily apply the present teaching to make and use an automated air filter for an HVAC system or other apparatus.

Figure 1:
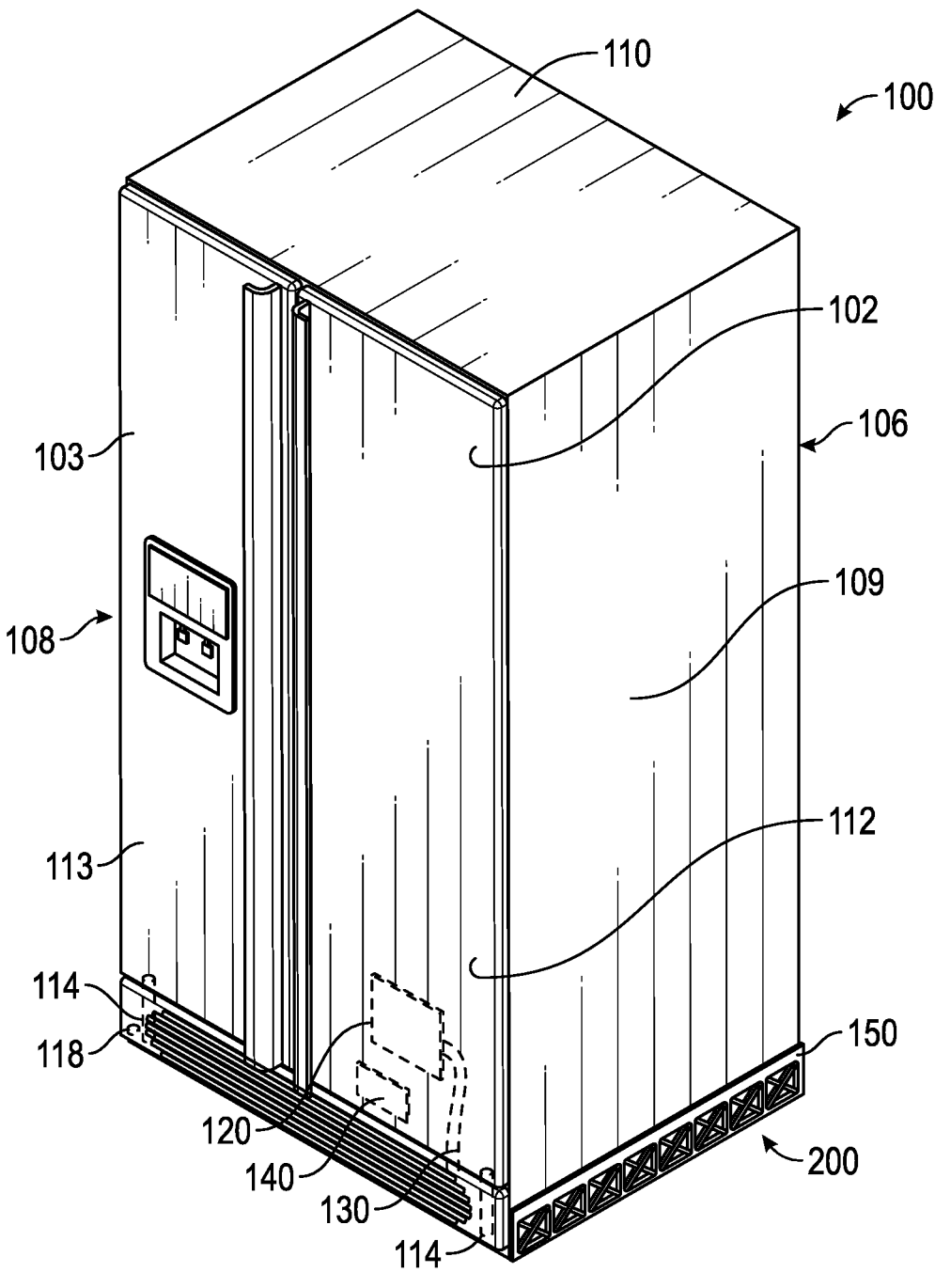
FIG. 1 is a perspective view of a refrigerator having an embodiment of the automated filter device.

FIG. 1 shows a refrigerator 100 having a first insulated compartment 102 and a second insulated compartment 103. First insulated compartment 102 can be a refrigeration compartment, and second insulated compartment 103 can be a freezer compartment. It is also contemplated that both insulated compartments can be refrigeration compartments, or both can be freezer compartments, or the refrigerator 100 can have only one insulated compartment, or three, four or more insulated compartments.

Figure 2:
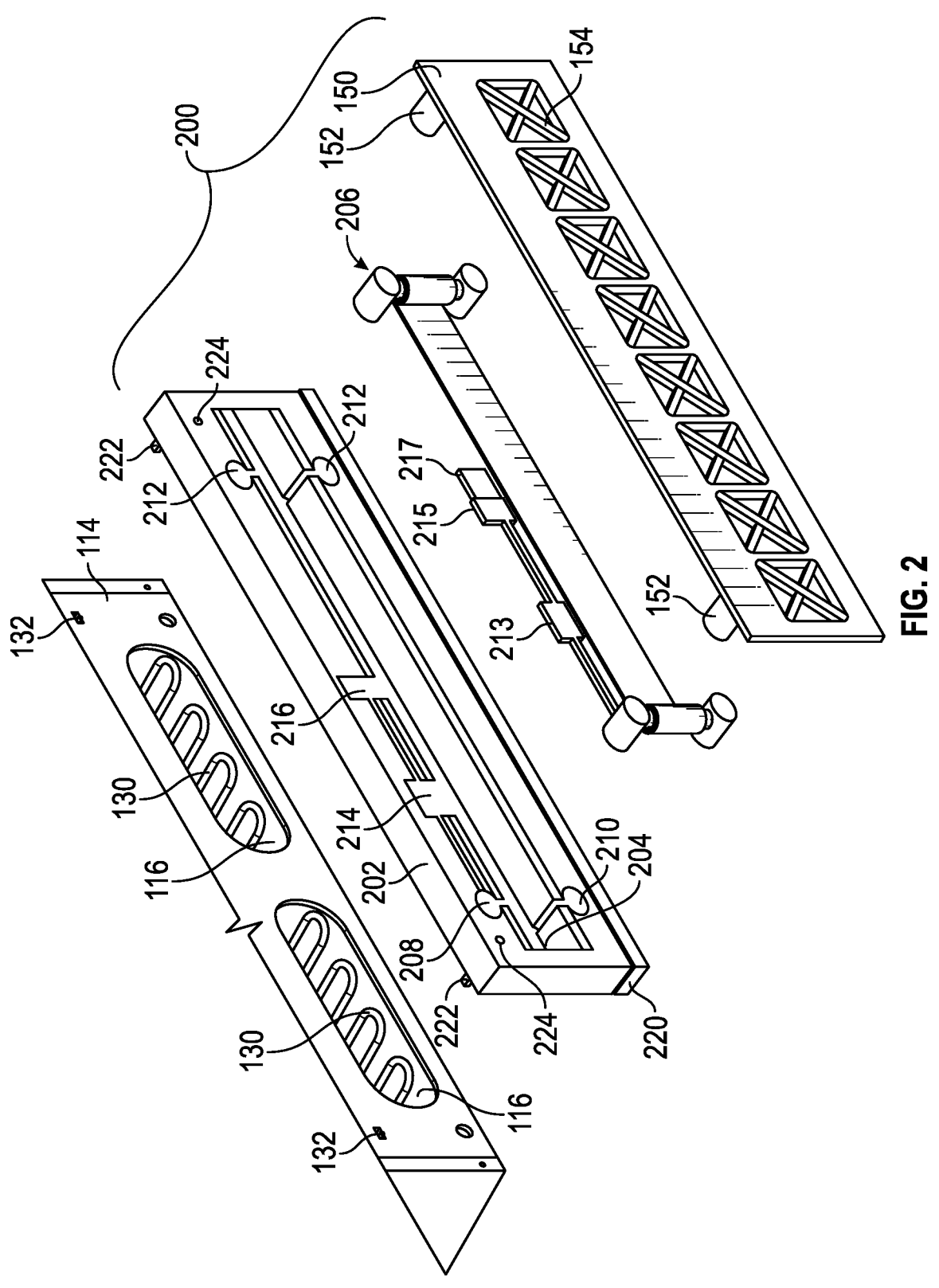
FIG. 2 is a perspective exploded view of an embodiment of the automated filter device.

The refrigerator 100 also has a front side 104, a back side 106, sidewalls 108, 109, a top side 110 and a bottom side (not visible). The insulated compartments 102, 103 can be accessed by opening doors 112, 113. The refrigerator 100 also comprises a platform 114 that supports the insulated compartments 102, 103 at a distance above the floor and provides the necessary support for refrigerator 100 and its components. By including a platform 114, it becomes possible to position refrigeration coils under the insulated compartment(s). Alternatively, the platform can be omitted, particularly when the coils are positioned on the back side 106 of the refrigerator. As shown in FIG. 2, the platform 114 has one or more access ports 116 which provide access to the components positioned below insulated compartment 102. In some embodiments, the platform 114 also comprises rollers or legs 118 which can be adjustable in height.

The refrigerator 100 also comprises a heat pump 120 having a compressor, a condenser and refrigerant. A refrigeration coil 130 is fluidly connected to heat pump 120 through which refrigerant is circulated. Preferably the coil 130 is a hollow thermally conductive tube which extends in a coiled or s-shaped back-and-forth fashion. In some embodiments, the coil 130 is positioned below insulated compartment 102 in the space created by platform 114. Alternatively, coil 130 can be positioned behind insulated compartment 102. Alternatively, coil 130 can be positioned both below and behind insulated compartment 102.

The refrigerator 100 also comprises an air moving device 140 such as a fan, a blower, or any other device which can force air to move over coil 130. The air moving device 140 can be positioned beneath insulated compartment 102. Alternatively, the air moving device 140 can be positioned behind insulated compartment 102.

Figure 3:
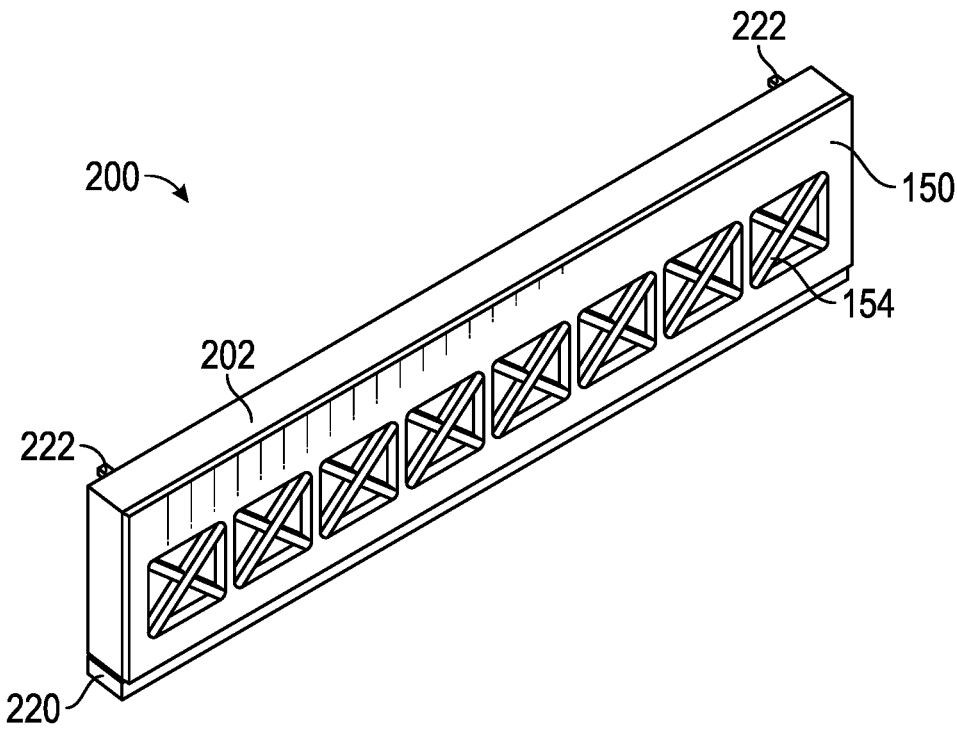
FIG. 3 is a perspective view of an embodiment of an assembled automated filter.

In order to physically shield the coil 130 from the external environment, a grill 150 is removably and replaceably connected to the platform 114 or the refrigerator 100. In FIGS. 1 to 3, grill 150 is positioned beneath insulated compartment 102 and is preferably connected to the platform 114 by way of a fastener 152. Existing refrigerators use a variety of fasteners 152, such as a mechanical spring-loaded arm arrangement which removably and replaceably engages access ports 132 on the platform 114. Alternatively, grill 150 can be connected to the platform 114 by any other conventional manner including a snap fit, frictional engagement, nuts and bolts, screws, the use of locking members, or a similar mechanical arrangement. Grill 150 can have any ornamental and aesthetically pleasing appearance, but it should have a plurality of openings 154 or other features that allow for the passage of air therethrough.

The present air filters and methods can be implemented with a refrigerator as described above and shown in FIG. 1. In some embodiments, the air filter is part of or integral to a refrigerator 100 or its platform 114. Alternatively, it can be added to an existing refrigerator. For example, an automated air filter 200 can be placed between grill 150 and coils 130, to filter air before it passes over coils 130. The air filter 200 is positioned beneath insulated compartment 102 and is connected to the front side 104 of the platform 114 in any conventional manner. In some embodiments, the air filter 200 extends across the entire horizontal length of the side 109 of the refrigerator 100 from front side 104 to back side 106. The air filter 200 can extend across the entire vertical distance between the bottom of the insulated compartment 102 to the floor. In this way, the filter 200 seals the entire opening created by platform windows 116 as well as sealing the entire area between the bottom side of platform 114 and the floor.

In some embodiments, the air filter 200 has a frame 202 that defines a window 204 into which a filter sheet 206 can be positioned. Preferably, frame member 202 is shaped to support filter sheet 206. In some embodiments, frame 202 comprises a single or integral piece; in other embodiments, frame 202 comprises multiple pieces that are permanently connected to one another, such as by welding, gluing, or other connection. Alternatively, the frame pieces are removeably connected to one another, such as by a snap fit, frictional engagement, nuts and bolts or any other mechanical connection which allows for replacement of filter sheet 206. The frame 202 and its pieces are made of any suitable material such as fiberglass, plastic, composite, wood, chipboard, metal or the like.

Filter sheet 206 can be formed from any filtering material that allows air to pass but prevents passage of most particles, contaminants, or debris, such as a sheet of fabric, felt, fiberglass, polyester fiber, or the like. To provide additional rigidity and malleability, a reinforcement can be connected to or passes through filter sheet 206. Frame 202 defines reel end compartments 208, 210, 212, 214 which are configured to support ends of reels. Frame 202 also defines a motor compartment 214 and a battery compartment 216.

The present devices can include a motor 213 configured to rotate one or both reels. The present devices can also include a power source 215 such as a battery to provide power to the motor. Alternatively the motor can be connected to the same power source as the refrigerator. The present devices can include a controller 217 connected to the motor and/or the power source. The controller 217 can be programmed to cause the motor to operate and to move the filter element at time intervals selected by the owner or predetermined by the manufacturer.

A compressible seal 220 can be provided to the bottom side of filter device 200. Compressible seal 220 can be made of any compressible and sealing component such as a seal, a gasket, a piece of foam, or the like. Compressible seal 220 contacts the floor and prevents air from passing between the bottom side of filter device 200 and the floor. In some embodiments, a compressible seal is also present on a top side and/or sidewalls of the air filter.

Connected to the back side of the air filter 200 is at least one and preferably a plurality of connecting members 222. In some embodiments, connecting member 222 is a magnet which is attached to the frame 202 in any suitable way, such as molding the magnets into the frame 202, gluing, welding, snap-fitting or the like. In this arrangement, the magnet magnetically holds the frame 202 to the platform 114 of the refrigerator 100 thereby holding the air filter 200 in place. In some embodiments, one continuous magnet extends across the horizontal length of the top backside and/or bottom backside of the air filter 200. Alternatively, individual magnets are positioned apart from one another across the horizontal length of the top backside and/or bottom backside of filter device 200.

In another arrangement, connection member 222 is a hook-and-loop arrangement such as Velcro, wherein one of the hook-and-loop sides is adhesively sealed to the air filter 200 and the other of the hook-and-loop sides is adhesively sealed to the platform 114. In this arrangement, when connected to one another, the opposing hook-and-loop sides engage one another, thereby holding the air filter 200 onto the platform 114. In some embodiments, one continuous piece of Velcro extends across the horizontal length of the top backside and/or bottom backside of the air filter 200 with an opposing piece of Velcro being positioned on the platform 114. Alternatively, small pieces of Velcro can be positioned apart from one another across the horizontal length of the top backside and/or bottom backside of the air filter 200 with opposing pieces of Velcro being positioned on the platform 114.

In another arrangement, connection member 222 is similar to the fasteners 152 (such as a mechanical spring loaded arm arrangement discussed above) which engages access parts 132. In some embodiments, the connectors 222 of the air filter 200 have the same size, shape, and means of engagement as the fasteners 152 of the grill 150, to facilitate the addition of the air filter to an existing refrigerator.

Alternatively, through holes 224 are positioned in filter device 200 which allow fasteners 152 to pass through the filter device 200 and engage the grill ports 132. This allows for the connection of removable grill 150 to refrigerator 100 when filter device 200 is in place.

In order to install an air filter 200 onto a refrigerator 100, a user removes grill 150 from the platform 114 by applying enough pressure to overcome the hold of spring loaded fasteners 152. Once removed, when using a filter device 200 having magnets, the user connects the back side of filter device 200 to the platform 114. In this position the magnets magnetically hold the filter device 200 in place.

When using an air filter 200 having Velcro connection members, the user adhesively applies one of the hook-and-loop sides to the platform 114. The user also adhesively applies the other of the hook-and-loop sides in the same but opposite position on the back side of the air filter 200. Once the opposing Velcro pieces are in place, the user connects the filter device 200 to the platform 114. In this position the opposing Velcro hook-and-loop pieces hold the air filter 200 in place.

When in position, the air filter 200 extends across the entire vertical and horizontal length of the space below insulated compartment 102. In this position, the compressible seal 220 engages the floor and the air filter 200 entirely covers the platform windows 116. This forces air to pass through the air filter 200.

Once in position, the grill 150 is re-installed. This can be accomplished by inserting the fasteners 152 through the through holes 224 in the air filter 200 or through the holes 224 of the air filter 200.

In some embodiments, two air filter 200 are positioned along the opposing sidewalls 108, 109. These air filter 200 cover the space between the bottom side of refrigerator 100 and the floor thereby preventing any contaminating air from accessing coils 130 from the spaces at the sides of the refrigerator 100. These filter devices 200 are attached by any of the ways described herein, including through the use of Velcro and magnets. This provides the advantage of filtering the air prior to accessing the coils 130. This helps to maintain clean coils 130 which reduces the need to clean the coils 130 and improves the efficiency of the refrigerator 100. Also, because the air filter 200 extends to the floor, this prevents food and particles dropped onto the floor from going under the refrigerator. In some embodiments, the coils 130 are substantially sealed from the surrounding environment, in that air can only reach the coils 130 after passing through the air filter 200.

From the above discussion it will be appreciated that the above-described device and method of use offers many advantages over the prior art. Namely, the device and method presented helps prevent the accumulation of debris on refrigerator coils; reduces or eliminates the need and inconvenience of cleaning refrigerator coils; improves the efficiency and longevity of refrigerators; saves energy; and can be retrofit to any existing refrigerator.

It will be appreciated by those skilled in the art that other various modifications could be made to the present device without parting from the spirit and scope of this invention. All such modifications and changes fall within the scope of the claims and are intended to be covered thereby.

As disclosed herein, a number of ranges of values are provided. It is understood that each intervening value, to the tenth of the unit of the lower limit, unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither, or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present teachings, some exemplary methods and materials are now described.

All patents and publications referred to herein are expressly incorporated by reference.

As used in the specification and appended claims, the terms "a," "an," and "the" include both singular and plural referents, unless the context clearly dictates otherwise. Thus, for example, "a filter" includes one filter and plural filters. Unless otherwise indicated, the terms "first", "second", "third", and other ordinal numbers are used herein to distinguish different elements of the present devices and methods, and are not intended to supply a numerical limit. Reference to first and second sides should not be interpreted to mean that the device only has two sides. A device having first and second elements can also include a third, a fourth, a fifth, and so on, unless otherwise indicated.

Generally, it is understood that the drawings and the various elements depicted therein are not drawn to scale. Further, relative terms, such as "above," "below," "top," "bottom," "upper," "lower," "left," "right," "vertical" and "horizontal," are used to describe the various elements' relationships to one another, as illustrated in the accompanying drawings. It is understood that these relative terms are intended to encompass different orientations of the filter devices and/or elements in addition to the orientation depicted in the drawings. For example, if the filter device were inverted with respect to the view in the drawings, an element described as "above" another element, for example, would now be "below" that element. Likewise, if the device were rotated 90 degrees with respect to the view in the drawings, an element described as "vertical," for example, would now be "horizontal."

In view of this disclosure it is noted that methods can be implemented in keeping with the present teachings. Further, the various components, materials, structures and parameters are included by way of illustration and example only and not in any limiting sense. In view of this disclosure, the present teachings can be implemented in other applications and components, materials, structures and equipment to implement these applications can be determined, while remaining within the scope of the appended claims.

I claim:

1. A refrigerator comprising a refrigeration coil, and an automated air filter comprising:

a frame configured for the refrigerator;

a plurality of reels mounted on the frame such that the reels are rotatable;

a filter sheet extending between the reels and across the frame; and an actuator configured for rotating one or more of the reels.

2. The refrigerator of claim 1, wherein the actuator is a motor.

3. The refrigerator of claim 2, wherein the frame comprises one or more recesses for holding the motor.

4. The refrigerator of claim 1, further comprising a power source.

5. The refrigerator of claim 4, wherein the frame comprises one or more recesses for holding the power source.

6. The refrigerator of claim 1, wherein the reels are plastic.

7. The refrigerator of claim 1, further comprising a controller connected to the actuator.

8. The refrigerator of claim 7, wherein the controller is programmed to cause the reel to advance the filter element at a desired time interval.

9. The refrigerator of claim 1, wherein the air filter is permanently attached to the refrigerator body.

10. The refrigerator of claim 1, comprising a closed chamber at a bottom side or a back side, and the coil is located within the closed chamber.

11. The refrigerator of claim 10, wherein the air filter is connected to the refrigerator so as to substantially seal the closed chamber.

* * * * *